United States Patent [19]

Jaklin

[11] Patent Number: 4,869,753

[45] Date of Patent: * Sep. 26, 1989

[54] METHOD FOR REPAIRING THE NEAR-SURFACE LAYERS OF BUILDINGS REINFORCED WITH CONSTRUCTIONAL STEEL

[76] Inventor: Hans Jaklin, Erlenhof, Aacherweg 15, 5500 Trier, Fed. Rep. of Germany

[*] Notice: The portion of the term of this patent subsequent to Sep. 19, 2006 has been disclaimed.

[21] Appl. No.: 130,696

[22] Filed: Dec. 9, 1987

[51] Int. Cl.$^4$ ............................................. C04B 12/04
[52] U.S. Cl. ................................. 106/74; 106/14.21; 106/76; 52/514
[58] Field of Search .................... 106/14.05, 14.21, 74, 106/76; 922/7; 428/378; 52/514

[56] References Cited

U.S. PATENT DOCUMENTS

| | | | |
|---|---|---|---|
| 1,129,320 | 2/1915 | Vail et al. | 106/74 |
| 2,879,578 | 3/1959 | Ulfstedt | 106/14.21 |
| 2,944,919 | 7/1960 | Morris et al. | 106/14.21 |
| 3,180,746 | 4/1965 | Patton et al. | 106/74 |

FOREIGN PATENT DOCUMENTS 56-1102969  5/1986  Japan ..................................... 52/514

OTHER PUBLICATIONS

Article "The Protection and Restoration of Concrete", K. Sellars, Paint & Resin (Oct. 1984), pp. 33–37.
Heinrich Remy, "Lehrbuch de Anorganischen Chemie", vol. 1, 1952, pp. 421, 735–736.
"Kieselsäure als Verstärkerfüllstoff" (Silic acid as a reinforcing filler), pp. 38, 39 and 42.

Primary Examiner—William R. Dixon, Jr.
Assistant Examiner—David M. Brunsman
Attorney, Agent, or Firm—Sprung Horn Kramer & Woods

[57] ABSTRACT

For the repair of near-surface layers of buildings reinforced with constructional steel the corroded constructional steel is laid bare, treated with a solution of a modified alkali silicate with a $Me_2O : SiO_2$ ratio of 1:2 to 1:3 and covered with a mortar containing 2 to 6% by weight relative to the amount of cement of a finely composed amorphous silicic acid with at least 90% by weight $SiO_2$ finely composesd, precipitated, active silicates of magnesium, calcium, barium or aluminum with a BET surface of 50 to 200 m$^2$/g and a $d_{50}$% value below 20 μm.

4 Claims, No Drawings

METHOD FOR REPAIRING THE NEAR-SURFACE LAYERS OF BUILDINGS REINFORCED WITH CONSTRUCTIONAL STEEL

SPECIFICATION

In structures made of reinforced concrete the concrete has two functions to fulfill. It has to absorb compressive strains and it has to protect the steel against corrosion. The reinforced steel serves the function of absorbing the shear and tensile stress.

The protective effect of the hardened cement paste for the iron and its duration are dependent on several factors. On the one hand there are the climactic and environmental conditions and on the other hand there is the quality of the concrete which is primarily determined by the amounts of cement, the grain of the concrete aggregate, the water cement factor and the concrete compression.

The protective effect of the concrete for the iron is dependent on the high alkalinity of the $Ca(OH)_2$ produced during hydrolysis - pH around 13. The carbonic acid formed by the carbon dioxide in the air together with water reacts with the calcium ions of the calcium silicate hydrate or calcium aluminate hydrate phases of the hardened cement paste forming calcium carbonate. The concrete carbonates, as this process is generally called, at a concrete dampness, which arises at a relative humidity of under around 60%. If the concrete pores are practically completely filled with water, the carbonation comes to a halt. How quickly and how deep the carbonation penetrates the concrete depends on the dampness of the concrete and its structure. In the case of complete carbonation the pH value of the concrete drops to around 8. The corrosion of the iron still does not need to set in if as in the inner spaces the concrete is dry. Concrete dampnesses which come about at relative humidities of between 80 and 100%, lead to the formation of rust on the reinforced iron, as soon as the pH value of the surrounding institial fluid drops below 9.5. The corrosion is increased substantially by salts (thawing salts) which penetrate together with the water. In particular the chloride ions lead to the feared holes being eaten into the iron, which then reduces the supporting capacity of the structure. But also the overall surface corrosion of the iron, which only leads to an insignificant loss in strength of the building structure in the beginning, can already cause large follow-up damage. The take up of oxygen and hydration water increases the weight of the corrosion product, $Fe_2O_3 \times H_2O$, referring to the amount of corroded iron to the amount of absorbed hyration water. Depending upon the amount of the absorbed hydration water and the embedded salts the corrosion products of the steel can take on four to eight times the original volume. As a result of the increase in volume first of all the surface layers split away. Later cracks form throughout the entire building.

An entire system of steps is necessary to repair reinforced concrete which has been damaged in this manner. This system must be adapted to the characteristics of the corroded steel and the carbonated concrete. A lasting reconstruction of the building can only be attained, if one succeeds in 1. eliminating any further corrosion of the steel,
2. reinstating a strong bond between the steel and the concrete,
3. filling the missing spots with a repairing mortar which adheres tightly to the old concrete and the iron and then
4. in sealing the entire outer surface of the structure against the penetration of moisture.

If we disregard the secondary work necessary, we can easily divide the repair process into two phases. The first concerns putting an end to the corrosion of the steel and the second concerns filling the holes and cracks in the concrete surface.

The known repair processes require eight steps which in part are very complicated: After the concrete steel is uncovered the steel has to be sand blasted until is has a metallic shine. As a third step a protective coating is applied to the steel which is then sprinkled with sand which serves as an adhesive bridge for the repair mortar, before the protective coating dries. In the fourth step the cavities in the concrete surface are coated with a sand-polymer-cement-water mixture so that the filling mixture consisting of a synthetic cement mortar bonds well to the old concrete. The further steps involve the final treatment of the concrete surface, the evening out of the concrete surface, coating the same with a primer and applying a protective coating which prevents the carbonation of the upper concrete layers. (Paint & Resin Oct. 1984, p. 33–37)

The complete sand blast removal of rust is only possible all over, if the constructional steel can be uncovered enough, in particular the space between the reverse side of the steel and the concrete has to be big enough so that the spray jet can be introduced into it to remove the rust.

DE-OS No. 35 13 566 describes a process for inhibiting the corrosion of steel material, which is built into inorganic building materials, the reinforced concrete surface of which is impregnated consecutively with an aqueous solution of an inorganic salt which has a corrosion inhibiting effect on the steel material and with an aqueous solution of a water-soluble silicate. Nitrites, in particular, are used as corrosion protecton inhibiting salts. It is determined in this reference that alkali silitcates alone do not produce an adequate corrosion protection.

The repair mortar described in the literature contains besides cement, sand and water also synthetic resin dispersions. To 1 part by volume (loose pouring) cement 0.1 to 1.0 part by volume synthetic dispersion are used. With respect to the cement that is around 8 to 48 % in weight of synthetic resin dispersion. Working with cement mortar tempered and hardened with synthetic resin (KVZ mortar) is made more difficult by the fact that it has to be processed within 30 to 45 minutes or else setting difficulties arise. Further atmospheric conditions and the degree of dampness of the concrete foundation hamper the repair work. At temperatures below 5 to 8° C., if it rains and conditions are damp and cold and the foundation is wet working with this mortar group is out of the question.

Whereas cement hardens hydraulically, i.e. requiring water to set, contrarily the synthetic resin part of the mortar hardens after the water has evaporated. Therefore there is no need for subsequent wetting of the repair layer, which however is detrimental to the cement components in the case of low relative humidities. The conflicting chemical and physical character of cement and synthetic resin disperion and of hardened concrete and synthetic resin makes the use of KVZ mortar problematic, the higher the amount of synthetic resin.

In wet years still another disadvantage of repairing walls with KVZ mortar showed up. The facades became green with algae. Building components containing synthetic resin, if sufficient dampness occurs, are a good nutritive medium for parasites and other lower life forms.

The two-component synthetic resin mortar with an epoxy resin or polyurethane base do not need to be treated here as extraneous to this type of mortar, although they too are suitable for repairing concrete surfaces under certain conditions.

The great expense including the secondary work of removing the rust (further chiselling out of the concrete and the sand blasting) and the work of producing a protective coating with the known anti-corrosive paints which completely covers the steel as well as the problems which may arise through the use of alkali sensitive finishing coats (concrete pH = around 13), indicate the necessity for a simplification and improvement of the processes for reconstructing building structures made of reinforced concrete.

According to the method taught in the invention for repairing near-surface layers of buildings reinforced with constructional steel the corroded steel parts are uncovered by removing the loose rust and the carbonated concrete in the vicinity of the reinforcement. The constructional steel and its neighboring concrete mass are treated with an aqueous solution of a modified alkali silicate having an $Me_2O : SiO_2$ weight ratio of 1:2 to 1:3 and then covered with cement mortar which contains 2 to 6 % by weight relative to the amount of cement of a finely composed amorphous silicic acid with at least 90 % by weight $SiO_2$ or finely composed, precipitated, active silicates of magnesium, calcium, barium or aluminum with a BET surface of 50 to 100 $m^2/g$ and a d 50% value in accordance with the grain analysis of Cilas below 20 μm.

In the above general formula $Me_2O$ for the alkali oxide part of the modified alkali silicate Me means lithium, sodium or potassium, wherein the latter is preferred in admixture with sodium. A percent by volume of the alkali silicate is usually diluted with 0.5 to 2 percent by volume water. That corresponds to $SiO_2$ concentrations in the solution of around 7 to 20 percent by weight. The BET method used hereinabove and hereinbelow for determining the surface by calculating the monolayer capacity is from Brunauer, Emmet and Teller and is described inter alia in "Ullmanns Enzyklopädie der technischen Chemie, Band II/1", P. 758/759.

For the grain analysis an apparatus made by the Cilas company is used. It functions according to the laser beam method. This method is described by J. Swithenbank et al. in "Experimental diagnostics in gas phase combustion systems, Progress in Astronautics and Aeronautics Vol. 53, (1977)".

Preferred as the finely composed silicates added to the mortar are barium silicate with a composition of 40% BaO, 52% $SiO_2$ and 8% annealing loss or a sodium aluminum silicate with a composition of 73 % $SiO_2$, 7% $Al_2O_3$, 7% $Na_2O$ and 12% annealing loss.

Usually the technically produced silicic acid and silicates contain residual amounts of $Na_2O$ and $So_4^{-2}$ from the raw materials as well as a little $Fe_2O_3$ and traces of other oxides. The sum of these foreign substance parts amount to 1–1.5%.

It is recommendable to saturate the repaired surface after setting with a modified alkali silicate solution.

It is surprising that the combination of the steps of the invention together with the means used in the invention is sufficient to reconstruct structures made of reinforced concrete in a simple and lasting manner.

The relatively low amount of between 2–6 percent by weight of a finely composed amorphous silicic acid or a Na-Al-silicate improves the processing characteristics of the cement-sand-water mixture by practically unchanged setting behavior.

There is no phase separation which occurs by the floating to the surface of water with fine amounts of cement; in other words the so-called bleeding of the mortar or of the concrete is completely eliminated. This mortar mixture with the same water/cement factor is also more plastic. Therefore the mortar can be better worked into narrow joints and the surface can be spread more smoothly. The repair mortar used in the invention is also water-tight without any subsequent treatment, while maintaining its permeability to water vapor.

The following examples explain the method of the invention in more detail.

EXAMPLE 1

The concrete layer of the vertical surface of a reinforced concrete building had split off due to rust so that the first layer of the reinforcement was laid bare. The loose concrete parts were chiselled out and the loose rust on the reinforcement was scratched away. The concrete surface in the area of repair as well as the iron parts were coated completely and saturated with the modified alkali silicate solution. The transitions to the undamaged old concrete also received this coating. The alkali silicate solution used has the following composition:

| | |
|---|---|
| $SiO_2$ | 19.14% |
| $Na_2O$ | 7.54% |
| $CrO_4$ | 0.31% |
| $CO_2$ | 0.7% |
| Ethanol | 0.92% |

The rest, to 100%, consisted of water

| | |
|---|---|
| Weight ratio | $SiO_2:Na_2O$ = 2.54:1 |
| Density | 1.251 |
| Viscosity | 10.1 cP |
| Surface tension | 54 dyn/cm |
| pH value | 11.4 |

A dry mixture was produced using 1 percent by weight PZ 350 F and 3.5 parts by weight of sand with a grain of 0–2 mm as well as 3 percent by weight, relative to the cement, of a finely composed amorphous silicic acid with a BET surface of 140 $m^2/g$ and 93.8% SiO, based on the state of supply. Thereafter 0.5 parts by weight of water were added and mixed together with the dry mortar to produce a plastic repair mortar.

The spot under repair allowed to dry slightly after the alkali silicate coating was roughcast with the repair mortar in such a way that the repaired surface was flush with the old concrete surface. After the cement mortar had set the spot under repair was saturated with the modified alkali silicate solution.

EXAMPLE 2

Water absorption according to DIN 52 103 I A was examined in % of volume of the following test bodies:

(a) a body produced from the mortar mixture of Example 1, but without the addition of 3% finely composed amorphous silicic acid.

(b) A body produced from the mortar mixture of the Example, i.e. using 3% finely composed amorphous silicic acid.

(c) According to the invention the body b) was saturated with the modified alkali silicate solution.

In the table we find the measured values, the mean of six test bodies, for the specimens stored for 28 days. The bodies in c) received their alkali silicate coating following 25 days' storage and three further days' drying.

| Test bodies | Water absorption according to DIN 52103 I A in % by volume |
| --- | --- |
| (a) without silicic acid | 6.7 |
| (b) with 3% silicic acid | 0.11 |
| (c) with 3% silicic acid and previous saturation with the modified alkali silicate solution | 0.0 |

It will be understood that the specification and examples are illustrative but not limitative of the present invention and that other embodiments within the spirit and scope of the invention will suggest themselves to those skilled in the art.

What is claimed is:

1. A method for the repair of near-surface layers of buildings reinforced with constructional steel, comprising exposing the corroded constructional steel, treating the exposed steel with a solution of a modified alkali metal silicate with an alkali metal oxide:$SiO_2$ ratio fo 1:2 to 1:3, and covering the surface with a cement mortar containing 2 to 6% by weight relative to the amount of cement of (a) a finely composed amorphous silicic acid with at least 90% by weight $SiO_2$ or (b) a finely composed, precipitated, active magnesium silicate, calcium silicate, barium silicate or aluminum silicate, each with a BET surface of 50 to 200 m$^2$/g and a d$_{50}$% value below 20 μm.

2. The method according to claim 1, wherein the mortar contains a finely composed precipitated silicate exhibiting a $SiO_2$ content of 56 to 85% on a water-free basis.

3. The method according to claim 1, wherein the mortar contains a precipitated finely composed active sodium aluminum silicate comprising 5 to 15% by weight $Al_2O_3$ and 1 to 10% by weight $Na_2O$ on a water-free basis.

4. The method according to claim 1, including the further step of saturating the entire repaired surface with the solution of the modified alkali metal silicate after the setting of the mortar is complete.

* * * * *

UNITED STATES PATENT AND TRADEMARK OFFICE
CERTIFICATE OF CORRECTION

PATENT NO. : 4,869,753
DATED : September 26, 1989
INVENTOR(S) : Hans Jaklin

It is certified that error appears in the above-identified patent and that said Letters Patent is hereby corrected as shown below:

ON TITLE PAGE:

ABSTRACT: line 8 after "$SiO_2$" insert --or--

Signed and Sealed this

Twenty-third Day of June, 1992

Attest:

DOUGLAS B. COMER

*Attesting Officer*   Acting Commissioner of Patents and Trademarks